United States Patent
Chandler et al.

(10) Patent No.: US 10,112,696 B2
(45) Date of Patent: Oct. 30, 2018

(54) STABILIZER SACRIFICIAL SURFACES

(71) Applicant: United Technologies Corporation, Hartford, CT (US)

(72) Inventors: Jesse M. Chandler, South Windsor, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/440,887

(22) PCT Filed: Mar. 15, 2013

(86) PCT No.: PCT/US2013/032028
§ 371 (c)(1),
(2) Date: May 6, 2015

(87) PCT Pub. No.: WO2014/074149
PCT Pub. Date: May 15, 2014

(65) Prior Publication Data
US 2015/0259059 A1 Sep. 17, 2015

Related U.S. Application Data

(60) Provisional application No. 61/725,129, filed on Nov. 12, 2012.

(51) Int. Cl.
*B64C 1/26* (2006.01)
*B64C 5/02* (2006.01)
(Continued)

(52) U.S. Cl.
CPC .................. *B64C 1/26* (2013.01); *B64C 1/06* (2013.01); *B64C 5/02* (2013.01); *B64D 25/00* (2013.01);
(Continued)

(58) Field of Classification Search
CPC ........ B64D 25/00; B64D 27/20; B64D 33/02; B64D 2033/0286; B64C 1/26; B64C 5/02; B64C 1/06
(Continued)

(56) References Cited

U.S. PATENT DOCUMENTS 2,844,339 A * 7/1958 Stroukoff ................ B64C 25/66
114/274
D189,328 S * 11/1960 Thieblot ........................ 244/87
(Continued)

FOREIGN PATENT DOCUMENTS

EP     1046577 A2    10/2000

OTHER PUBLICATIONS

"Austrian Show Case Disaster Relief", Daiamond Aircarft industries, Feb. 2012.*

(Continued)

*Primary Examiner* — Assres H Woldemaryam
(74) *Attorney, Agent, or Firm* — Carlson, Gaskey & Olds, P.C.

(57) ABSTRACT

An aircraft assembly is disclosed and includes a fuselage including a turbine engine mounted within the aft fuselage. A burst zone is defined about the turbine engine and a tail is disposed at least partially with the burst zone. The tail includes primary control surfaces and sacrificial control surfaces. The sacrificial control surfaces can break away in a defined manner to maintain integrity of the primary control surfaces outside of the burst zone.

9 Claims, 5 Drawing Sheets

(51) Int. Cl.
*B64D 25/00* (2006.01)
*B64D 27/20* (2006.01)
*B64D 33/02* (2006.01)
*B64C 1/06* (2006.01)

(52) U.S. Cl.
CPC ............ *B64D 27/20* (2013.01); *B64D 33/02* (2013.01); *B64D 2033/0286* (2013.01)

(58) Field of Classification Search
USPC ...................................................... 244/45 R
See application file for complete search history.

(56) References Cited

U.S. PATENT DOCUMENTS

| | | | | |
|---|---|---|---|---|
| 3,286,470 | A | * | 11/1966 | Gerlaugh ............... B64D 27/20 244/15 |
| 3,362,659 | A | * | 1/1968 | Razak ................... B64C 23/005 244/1 R |
| 3,455,523 | A | * | 7/1969 | Hertel ..................... B64C 5/06 244/130 |
| D245,157 | S | * | 7/1977 | Seidel ......................... D12/333 |
| 4,291,853 | A | | 9/1981 | Sigalla |
| 4,448,372 | A | | 5/1984 | Larson |
| 4,500,055 | A | * | 2/1985 | Krojer ................... B64D 27/14 244/55 |
| 5,115,996 | A | * | 5/1992 | Moller ................. B64C 29/0025 239/265.19 |
| 5,289,996 | A | | 3/1994 | Speelman, III |
| 5,435,504 | A | * | 7/1995 | Inoue ..................... B64C 1/061 244/119 |
| 5,445,346 | A | | 8/1995 | Gilbert |
| 6,102,332 | A | * | 8/2000 | Haxton .................. B64C 39/02 244/118.2 |
| 6,170,780 | B1 | * | 1/2001 | Williams .................. B64C 1/00 244/15 |
| 6,199,795 | B1 | * | 3/2001 | Williams .................. B64C 1/00 244/130 |
| 7,600,717 | B2 | | 10/2009 | Ward |
| 7,709,772 | B1 | * | 5/2010 | Patel ....................... F42B 3/006 244/3.25 |
| 7,780,116 | B2 | | 8/2010 | Payen |
| 8,038,095 | B2 | * | 10/2011 | Herzberger ............ B64C 25/52 114/274 |
| 8,136,766 | B2 | * | 3/2012 | Dennis ..................... B64C 3/38 244/131 |
| 2007/0102575 | A1 | * | 5/2007 | Morgan ................... B64C 5/02 244/87 |
| 2008/0073459 | A1 | | 3/2008 | Cazals et al. |
| 2009/0020643 | A1 | | 1/2009 | Gall et al. |
| 2009/0084889 | A1 | * | 4/2009 | Cazals ..................... B64C 5/02 244/12.1 |
| 2010/0148000 | A1 | * | 6/2010 | Llamas Sandin ......... B64C 5/02 244/87 |
| 2011/0303795 | A1 | * | 12/2011 | Oliver ................. B64C 29/0033 244/7 R |
| 2012/0138738 | A1 | * | 6/2012 | Vela Orge ................ B64C 5/02 244/87 |
| 2013/0001356 | A1 | | 1/2013 | Llamas Sandin et al. |
| 2013/0204544 | A1 | * | 8/2013 | Thomas ................ G01P 21/025 702/41 |
| 2013/0205747 | A1 | * | 8/2013 | Suciu ....................... F02K 3/06 60/39.15 |
| 2013/0205752 | A1 | * | 8/2013 | Suciu ....................... F02K 3/025 60/226.1 |

OTHER PUBLICATIONS

"Flying the Plastic Duck", Nov. 9, 2005.*
International Search Report and Written Opinion for International Application No. PCT/US2013/032028 dated Dec. 4, 2013.
International Preliminary Report on Patentability for International Application No. PCT/US2013/032028 dated May 21, 2015.

* cited by examiner

STABILIZER SACRIFICIAL SURFACES

CROSS REFERENCE TO RELATED APPLICATION

This application claims priority to U.S. Provisional Application No. 61/725,129 filed on Nov. 12, 2012.

STATEMENT REGARDING FEDERALLY SPONSORED RESEARCH OR DEVELOPMENT

This invention was made with government support under NASA Cooperative Agreement No. NNX11AB35A. The Government has certain rights in this invention.

BACKGROUND

Conventional aircraft architecture includes wing mounted gas turbine engines. In some aircraft architectures gas turbine engines are mounted atop the fuselage or on opposite sides of the aircraft fuselage.

Commercial aircraft typically utilize gas turbine engines that in include a fan section driven by a core engine or gas generator. The core engine includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section through a driven shaft.

Alternate aircraft architectures may require alternate mounting locations of the gas turbine engines to enable specific wing and fuselage configurations. However, conventional gas turbine engine configurations have been developed to operate with conventional aircraft architectures.

Accordingly, alternate gas turbine engine configurations may be required and developed to enable implementation of favorable aspects of alternate engine architectures.

SUMMARY

An aircraft according to an exemplary embodiment of this disclosure, among other possible things includes a fuselage, and a tail extending from the fuselage. The tail includes one or more sacrificial control surfaces and primary control surfaces. The primary control surfaces maintain aircraft controllability upon failure of the sacrificial control surfaces.

In a further embodiment of the foregoing aircraft, the tail includes a horizontal stabilizer and the sacrificial control surfaces and primary control surfaces are part of the horizontal stabilizer.

In a further embodiment of any of the foregoing aircrafts, the horizontal stabilizer is supported on a vertical stabilizer.

In a further embodiment of any of the foregoing aircrafts, the horizontal stabilizer is spaced apart from the fuselage in a direction that is substantially perpendicular to a longitudinal centerline of the fuselage.

In a further embodiment of any of the foregoing aircrafts, includes a propulsion system mounted to an aft end of the fuselage and a burst zone defined about the propulsion system that encompasses the sacrificial control surfaces.

In a further embodiment of any of the foregoing aircrafts, the propulsion system includes a gas turbine engine including a core engine disposed about a first axis driving a fan section disposed about a second axis angled relative to the first axis.

An aircraft assembly according to an exemplary embodiment of this disclosure, among other possible things includes a fuselage including a forward portion and an aft portion. A turbine engine is mounted within the aft portion. A burst zone is defined about the turbine engine. A tail is disposed at least partially with the burst zone. The tail portion includes primary control surfaces and sacrificial control surfaces. The sacrificial control surfaces break away in a defined manner to maintain integrity of the primary control surfaces outside of the burst zone.

In a further embodiment of the foregoing aircraft assembly, includes a horizontal stabilizer with the primary control surfaces and the sacrificial control surfaces disposed on the horizontal stabilizer.

In a further embodiment of any of the foregoing aircraft assemblies, includes a vertical stabilizer extending from the aft portion of the fuselage. The horizontal stabilizer is supported on the vertical stabilizer.

In a further embodiment of any of the foregoing aircraft assemblies, the sacrificial control surfaces are disposed at distal ends of the horizontal stabilizer.

In a further embodiment of any of the foregoing aircraft assemblies, the primary control surface is disposed between sacrificial control surfaces.

In a further embodiment of any of the foregoing aircraft assemblies, the turbine engine includes first and second turbine engines defining corresponding first and second burst zones.

In a further embodiment of any of the foregoing aircraft assemblies, the first and second turbine engines include corresponding core sections disposed about different axes that are angled away from each other.

In a further embodiment of any of the foregoing aircraft assemblies, the turbine engine includes a fan section disposed about a first axis driven by a core engine disposed about a second axis angled relative to the first axis.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
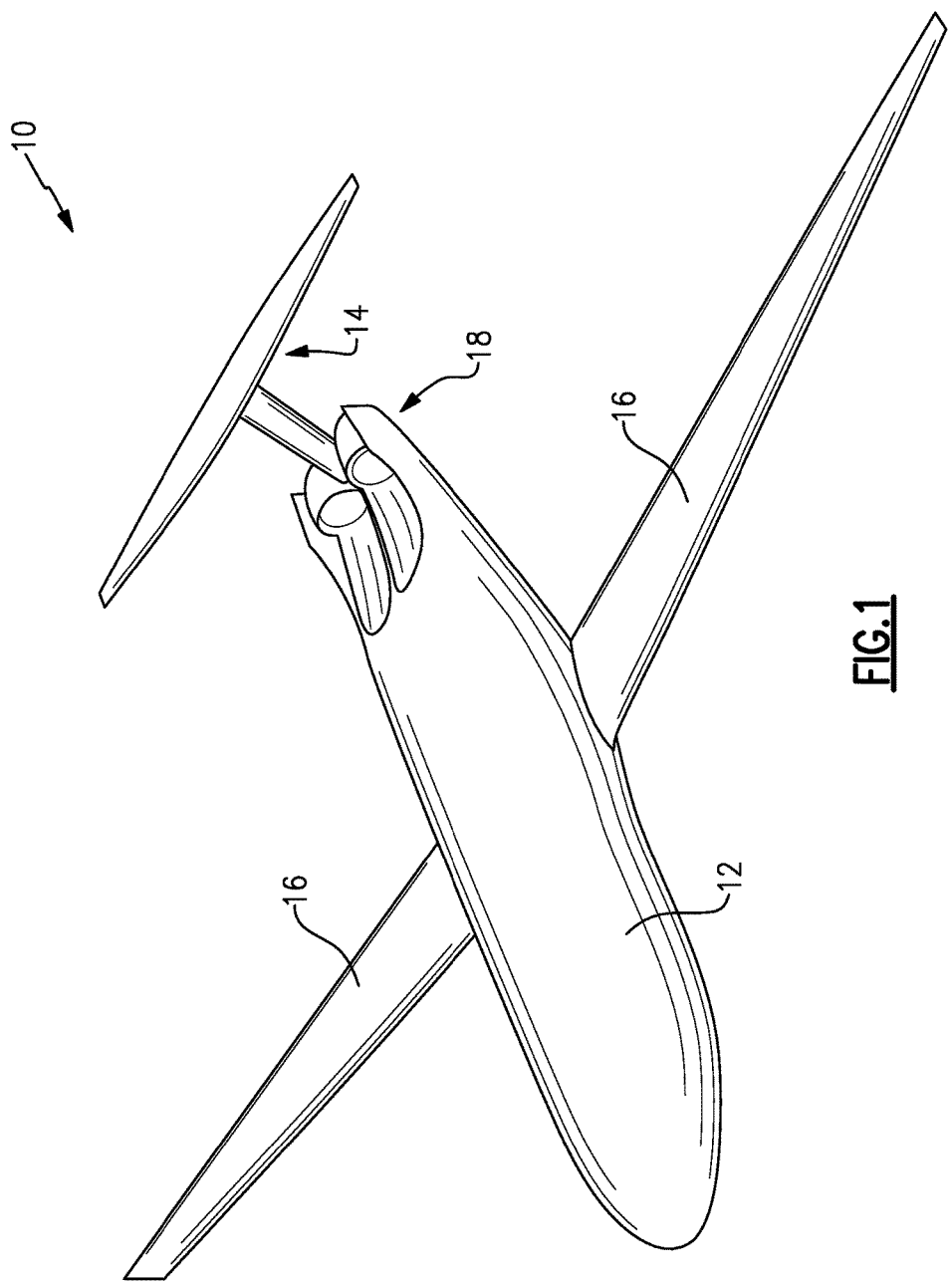
FIG. 1 is a schematic view of an example aircraft.
Figure 2:
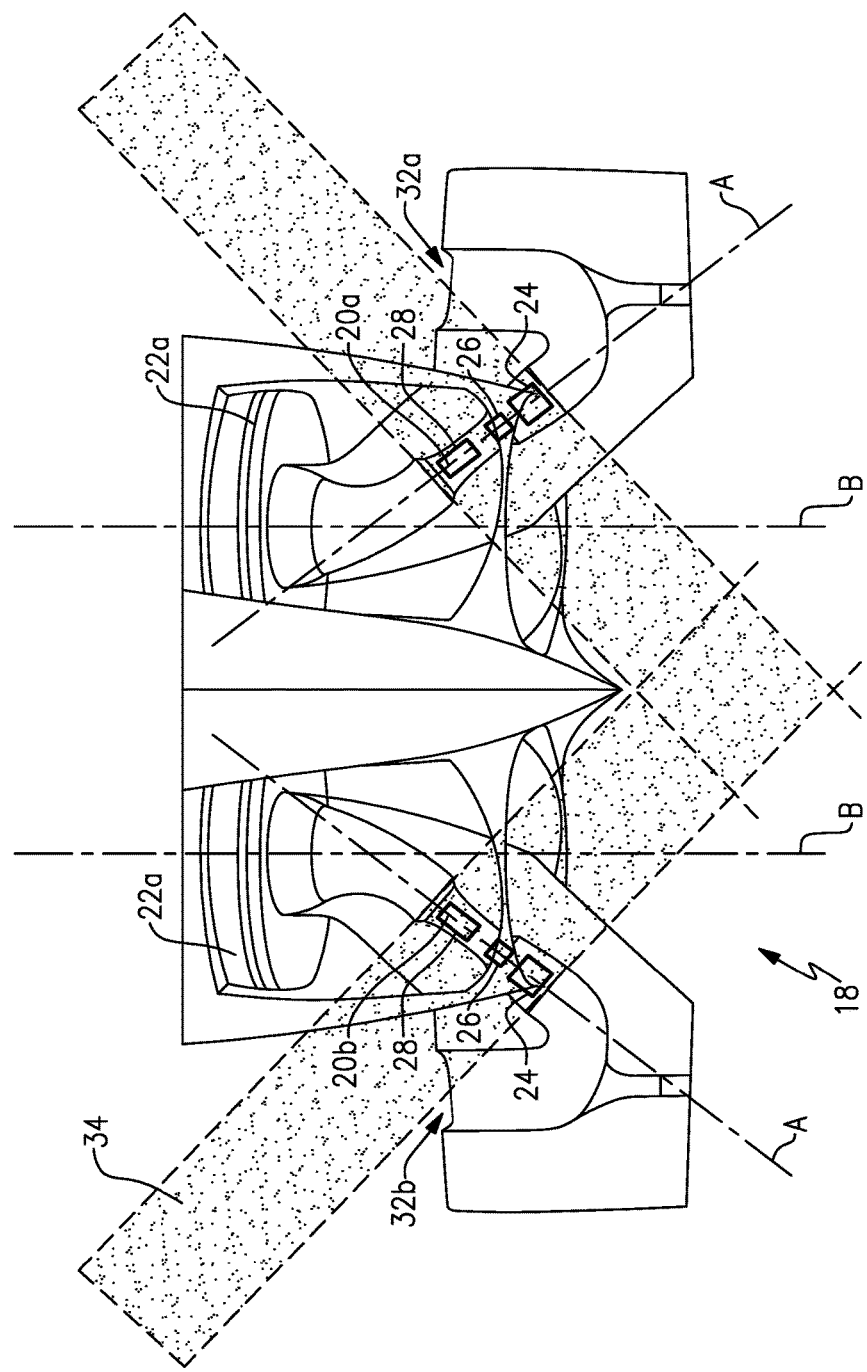
FIG. 2 is a schematic view of an example propulsion system.

Referring to the FIGS. 1 and 2 an aircraft 10 includes a fuselage 12 having wings 16 and a tail 14. A propulsion system 18 is mounted aft end of the fuselage 12. The propulsion system 18 includes first and second gas turbine engines. The gas turbine engines include first and second core engines 20*a-b* that drives corresponding first and second fan sections 22*a-b*.

Each of the first and second core engines 20*a-b* are disposed about an engine axis A and drive the corresponding fan sections 22*a-b* about a second axis B. The first axis A and second axis B are angled relative to each other. The example core engines 20*a-b* are commonly referred to as reverse flow engines and include a compressor 24, a combustor 26 and a turbine 28. Air is drawn in through inlets 32*a-b* to the compressor 24 is compressed and communicated to a combustor 26. In the combustor 26, air is mixed with fuel and ignited to generate a high pressure exhaust gas stream that expands through the turbine 28 where energy is extracted and utilized to drive the compressor 24 and corresponding fan 22*a-b*.

In the disclosed example, each of the first and second fans 22*a-b* is mounted substantially parallel to each other about respective second axes B. Gas turbine engines are not typically mounted next to each other due to practical limitations related to overall aircraft survivability in the event of engine failure. A Burst zone is defined around gas turbine engines within which another gas turbine engine is not permitted due to possible fragmentation from one failed engine disabling the second engine.

The disclosed core engines 20*a-b* are disposed at an angle relative to the corresponding second axes B and to each other such that neither core engine 20*a-b* is disposed within a burst zone 34 of the other core engine 20*a-b*. In other words, each of the core engines 20*a-b* is disposed at an angle away from the other core engine 20*a-b* such that each is orientated outside of the others bust zone 34.

Figure 3:
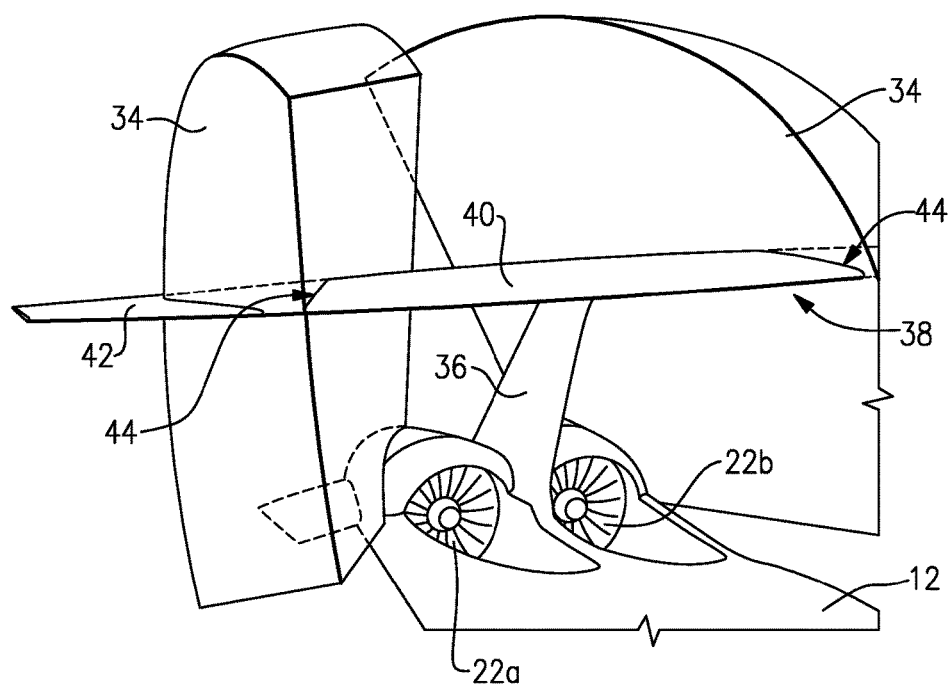
FIG. 3 is a schematic view of an example burst zone of the propulsion system.
Figure 4:
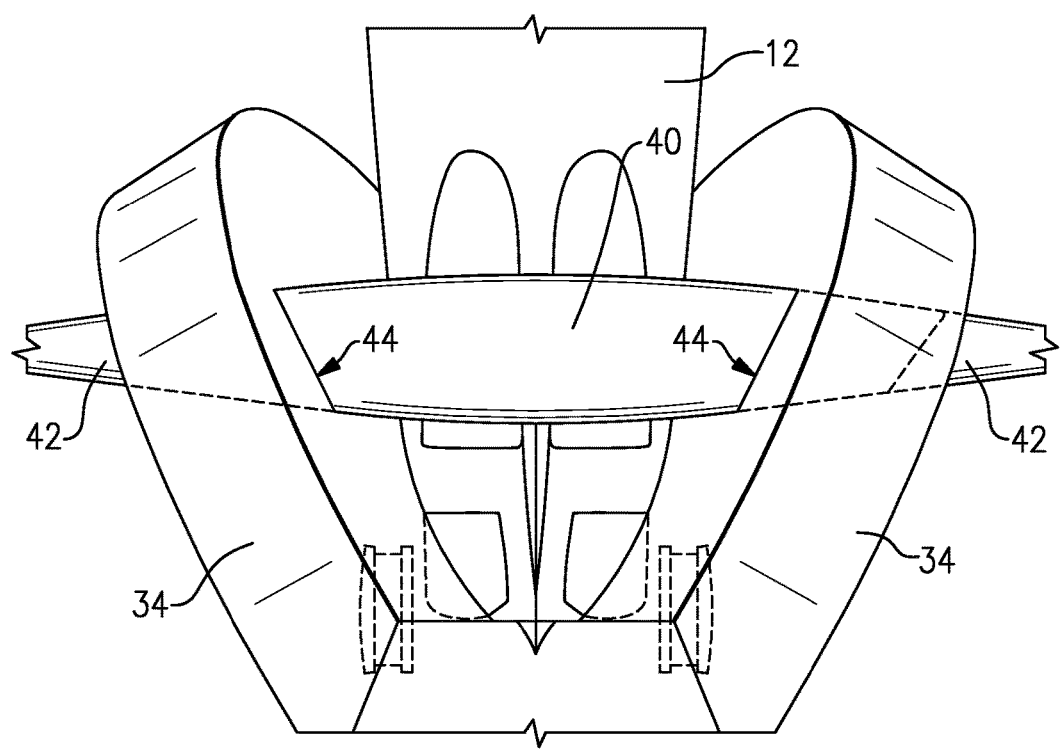
FIG. 4 is another schematic view of the example burst zone.

Referring to FIGS. 3 and 4, in some aircraft architectures, some control surfaces are provided in the example tail 14 may fall within the burst zone 34 defined by the angled orientation of the core engines 20*a-b*. In this example, the tail 14 includes a horizontal stabilizer 38 supported on a vertical stabilizer 36. The horizontal stabilizer 38 includes primary control surfaces 40 and sacrificial control surfaces 42. The sacrificial control surfaces 42 are disposed within the burst zones 34.

Figure 5:
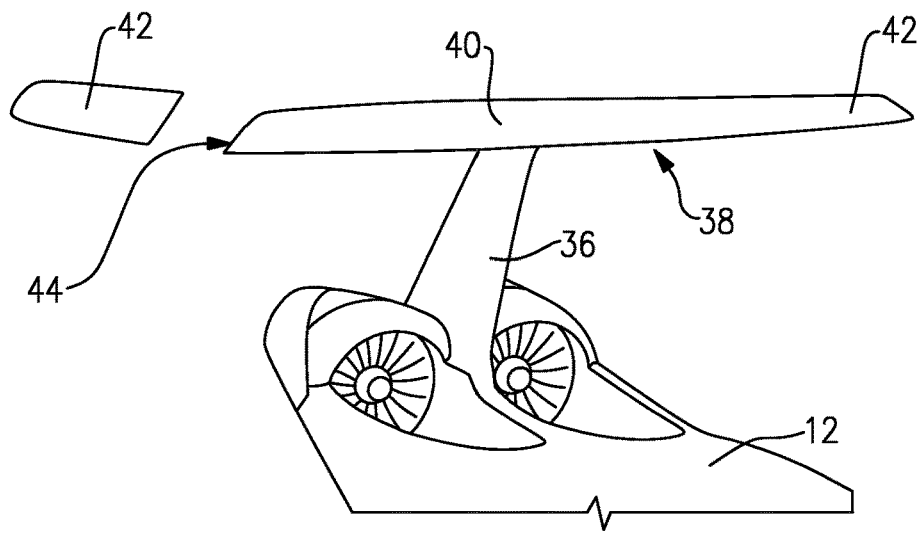
FIG. 5 is a schematic view of an example aircraft tail with sacrificial control surfaces.
Figure 6:
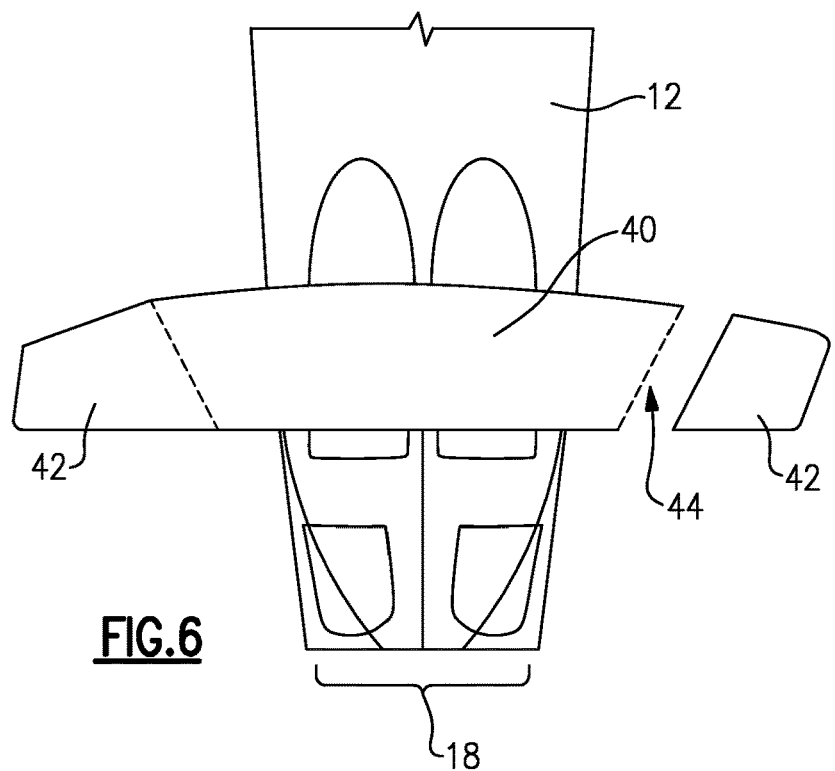
FIG. 6 is another view of the example aircraft with sacrificial control surfaces.

Referring to FIGS. 5 and 6 with continued reference to FIGS. 3 and 4, the sacrificial control surfaces 42 are within the burst zones 34 and are designed to break away should a strike from debris occur. The sacrificial surfaces 42 include a defined frangible connection 44 that breaks away in a controlled manner to enable the aircraft 10 to maintain stability and control. The non-break away or primary control surfaces 40 maintain the desired aircraft control after the loss of the sacrificial control surfaces 42. FIGS. 5 and 6 show the loss of one of the sacrificial control surfaces 42 in the event of failure of one of the core engines 20*a-b*.

Accordingly, the example aircraft architecture includes features that enable the use and operation of control surfaces within the burst zones by enabling a controlled break away to maintain integrity of control surfaces outside of the burst zones.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft comprising;
    a fuselage;
    a propulsion system mounted within an aft end of the fuselage, the propulsion system comprises a first gas turbine engine having a first core engine disposed along a first core engine axis and a second gas turbine engine including a second core engine disposed along a second core engine axis, the first core engine axis is angled relative to the second core engine axis, wherein a first fan section is driven by the first core engine and a second fan section is driven by the second core engine and both the first fan section and the second fan section are disposed aircraft forward of corresponding one of the first core engine and the second core engine; and
    a tail extending from the fuselage, the tail including a horizontal stabilizer supported on a vertical stabilizer, the horizontal stabilizer including at least one sacrificial control surface and primary control surfaces, wherein a burst zone is defined about the propulsion system that encompasses the sacrificial control surface, the sacrificial control surface including a defined frangible connection configured to break the sacrificial control surface away from the tail responsive to a strike from debris, wherein the primary control surfaces maintain aircraft controllability upon the sacrificial control surface breaking away from the tail.

2. The aircraft as recited in claim 1, wherein the horizontal stabilizer is spaced apart from the fuselage in a direction that is substantially perpendicular to a longitudinal centerline of the fuselage.

3. The aircraft recited in claim 1, wherein the first fan section disposed about a first fan axis angled relative to the first core engine axis and the second fan section is disposed about a second fan axis angled relative to the second core engine axis.

4. An aircraft assembly comprising
    a fuselage including a forward portion and an aft portion;
    a turbine engine mounted within the aft portion and having a core engine disposed along a core engine axis and a fan disposed forward of the core engine along a fan axis angled relative to the core engine axis, wherein a burst zone is defined about the turbine engine; and
    a tail disposed at least partially with the burst zone, the tail including a horizontal stabilizer supported on a vertical stabilizer, the horizontal stabilizer including primary control surfaces and sacrificial control surfaces, wherein the sacrificial control surfaces include a defined frangible connection that is configured to break a corresponding sacrificial control surface away from the tail in a defined manner responsive to a strike to the sacrificial control surface by a foreign object to maintain integrity of the primary control surfaces outside of the burst zone.

5. The aircraft assembly as recited in claim 4, wherein the sacrificial control surfaces are disposed at distal ends of the horizontal stabilizer.

6. The aircraft assembly as recited in claim 4, wherein the primary control surface is disposed between the sacrificial control surfaces.

7. The aircraft assembly as recited in claim 4, wherein the turbine engine comprises first and second turbine engines defining corresponding first and second burst zones.

8. The aircraft assembly as recited in claim 7, wherein the first and second turbine engines include corresponding first and second core engine sections disposed about different first and second core engine axes that are angled away from each other.

9. The aircraft assembly as recited in claim 4, wherein the turbine engine comprises a first turbine engine having a first core engine disposed along a first core engine axis driving a first fan section disposed about a first fan axis and a second turbine engine including a second core engine disposed along a second core engine axis that drives a second fan section disposed about a second fan axis, wherein the first core engine axis is angled relative to the second core engine axis and the first fan axis and the second fan axis are parallel to each other and angled relative to the corresponding one of the first core engine axis and the second core engine axis.

\* \* \* \* \*